United States Patent [19]

Takigawa et al.

[11] 4,217,942

[45] Aug. 19, 1980

[54] HEAVY DUTY PNEUMATIC TIRE

[75] Inventors: Hiroyoshi Takigawa; Toshiro Tezuka, both of Tokyo, Japan

[73] Assignee: Bridgestone Tire Company Limited, Tokyo, Japan

[21] Appl. No.: 961,069

[22] Filed: Nov. 15, 1978

[30] Foreign Application Priority Data

Nov. 17, 1977 [JP] Japan .................. 52-137232

[51] Int. Cl.³ .................. B60C 11/04; B60C 11/08
[52] U.S. Cl. .................. 152/209 R; 152/209 D
[58] Field of Search .................. 152/209

[56] References Cited

U.S. PATENT DOCUMENTS

| | | | |
|---|---|---|---|
| 2,432,847 | 12/1947 | Woods | 152/209 R |
| 3,559,712 | 2/1971 | Verdier | 152/209 R |
| 3,584,670 | 6/1971 | Verdier | 152/209 R |
| 3,698,462 | 10/1972 | Jacobs | 152/209 R |
| 3,727,661 | 4/1973 | Hoke | 152/209 R |

Primary Examiner—John E. Kittle
Attorney, Agent, or Firm—Sughrue, Rothwell, Mion, Zinn and Macpeak

[57] ABSTRACT

A heavy duty pneumatic tire is disclosed. This tire has a tread pattern comprising projections arranged independently and spaced apart from each other in the circumferential direction of the tire and transverse grooves for separating the projections one from the other. The projection is provided with a buttress nestling from the bottom of the transverse groove along the groove wall thereof and being partly united with the groove wall. The buttress extends toward the direction of the transverse groove at a height lower than the surface level of the projection and is arranged so as to produce a narrow gap between the opposed adjacent buttresses or between the buttress and the opposite projection.

6 Claims, 6 Drawing Figures

HEAVY DUTY PNEUMATIC TIRE

The present invention relates to heavy duty pneumatic tires and to advantageously diminish tread wear, particularly eccentric wear without deteriorating wet-resistant performance.

In general, tread patterns of various types such as rib type, lug type, rib-lug type, block type and rib-block type are selected in compliance with applications of the pneumatic tire. Particularly, the block type or rib-block type tread pattern is favorably used for heavy duty pneumatic tires in view of traction performance, heat durability and wet-resistant performance.

However, the block type or rib-block type tread pattern has a strong tendency to cause eccentric wear due to the movement of blocks at a ground contact area during the rotating of the tire under a heavy load, so that such a tread pattern is not necessarily satisfactory in the wear life of the tire.

The present invention aims at advantageously settling the aforementioned problems of the prior art.

According to the prior art, attempts have been made to provide a so-called platform in a transverse groove between the opposing blocks as a block reinforcement in order to restrain the movement of these blocks. In this case, the height of the platform is lower than the tread level, so that the movement of blocks is out of the question at the initial stage of the use. On the other hand, when the wear of the tread is advanced until the upper surface of the platform contacts with ground, the effective ground contact area of the tread immediately increases, which greatly contributes to prolong the wear life of the tire, while the transverse groove is unavoidably clogged to considerably deteriorate the wet-resistant performance. That is, the provision of the platform as proposed by the prior art essentially loses the merits inherent to the block type or rib-block type tread pattern with the advance of tread wear. On the contrary, the present invention has realized the improvement of the durability in the heavy duty pneumatic tire by effectively restraining the movement of blocks, i.e., by diminishing or preventing tread wear, particularly eccentric wear without deteriorating the wet-resistant performance during the overall use period of the tire.

The term "heavy duty pneumatic tire" used herein means to be tires mainly used in vehicles such as a bus, truck and the like.

In the present invention, the tread pattern of such tire comprises projections arranged independently and spaced apart from each other in the circumferential direction of the tire, and transverse grooves for separating the projections one from the other. That is, the arrangement of the projections in the circumferential direction of the tire shall be understood to include not only the case wherein adjacent projections are strictly opposed with each other in the circumferential direction of the tire but also the case wherein adjacent projections are slightly inclined to the circumferential direction of the tire and opposed with each other. As a result, the direction of the transverse groove shall be understood to include not only a direction strictly perpendicular to the circumferential direction of the tire but also a direction slightly inclined to the above defined direction. Therefore, the tread pattern of the tire according to the present invention covers tread patterns in general inclusive of the above mentioned block type or rib-block type tread pattern.

The present invention is characterized by providing the projection with a buttress nestling from the bottom of the transverse groove along the groove wall thereof and being partly united with the groove wall, extending toward the direction of the transverse groove at a height lower than the surface level of the projection and being arranged to produce a narrow gap between the opposed adjacent buttresses or between the buttress and the opposite projection. The buttress acts as a support or a stay wall for preventing such a movement that the projection is apt to fall toward the transverse groove while ensuring a drain path at the ground contact area by the above mentioned gap extending in the transverse groove during the rotating of the tire. According to the present invention, an improvement of durability against the tread wear can be obtained without deteriorating the wet-resistant performance of the heavy duty pneumatic tire.

The length of the buttress extending along the transverse groove is preferably at least 30% of the length of the projection extending along the transverse groove. When the length of the buttress is less than 30%, the sufficient effect of preventing the movement of the projection to diminish the tread wear at the ground contact area during the rotating of the tire under a load is not obtained.

The height of the buttress is preferably within a range of 40% to 80%, of the depth of the transverse groove. When the height is less than 40%, the same result as described in the case of the length of less than 30% is caused, while when the height exceeds 80%, there are disadvantages in the heat generation and braking performance.

According to the present invention, the buttress may be provided on each of adjacent projections opposing each other in the circumferential direction of the tire or may be provided on only the side of the projection causing a strong tendency of heel and toe wear. In any case, the narrow gap between the opposed adjacent buttresses or between the buttress and the opposite projection is within a range of 0.3 to 1.5 mm on a basis of an absolute value relating to the tire size naturally determined by any applications of the heavy duty pneumatic tire. The above defined range of the gap gives an anticipated drain performance to the tire and is usually such an extent that the contact between the opposed adjacent buttresses or the contact between the buttress and the opposite projection is induced when the traction is over a given value. The lower end of the gap is preferably equal to the bottom of the transverse groove, but the depth of the gap may be at least 25% of the height of the buttress measured from the bottom of the transverse groove.

The invention will now be described in greater detail with reference to the accompanying drawings, wherein.

Figure 1:
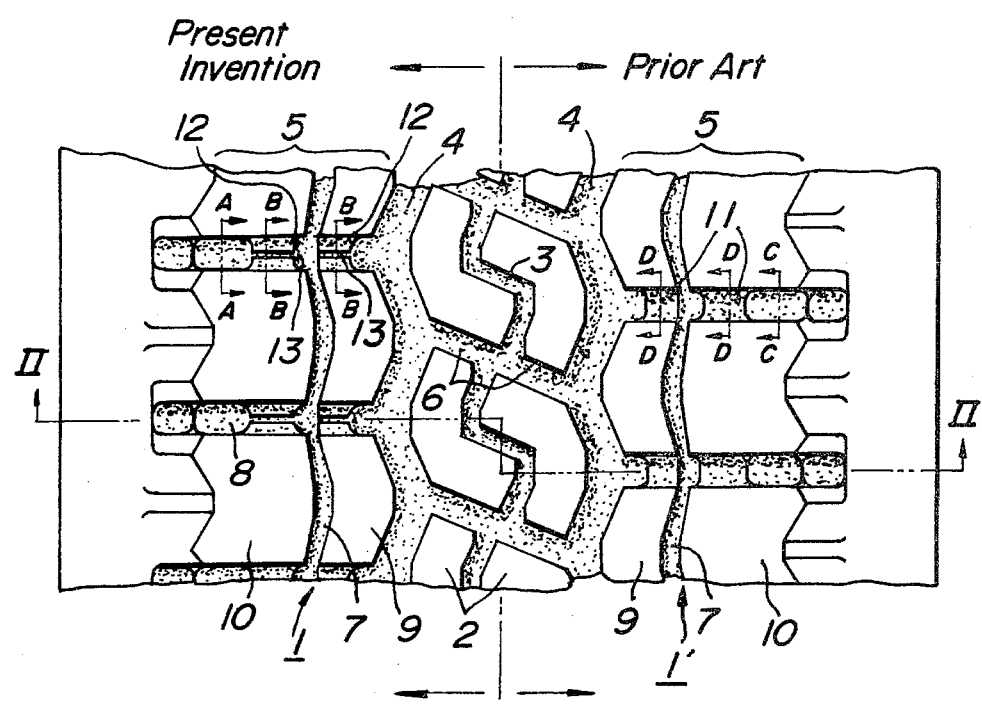
FIG. 1 is a developed view showing a part of a tread pattern of a heavy duty pneumatic tire wherein the left side of this figure shows a tread pattern according to the present invention and the right side thereof shows the tread pattern of the prior art.
Figure 2:
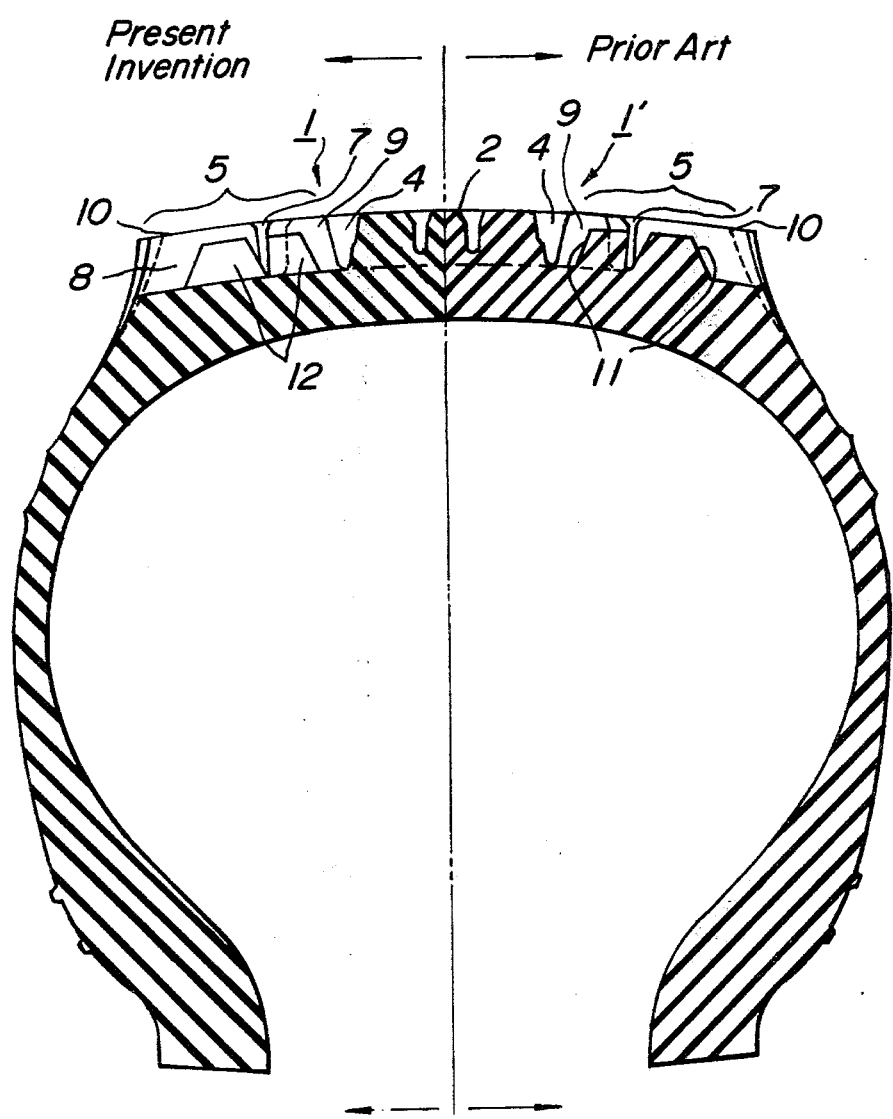
FIG. 2 is a sectional view taken along the line II—II of FIG. 1.

In FIG. 1 is shown a tread pattern of a heavy duty pneumatic tire by lumping embodiments of the present invention and the prior art together in left and right halves, and in FIG. 2 is shown a sectional view of the tire shown in FIG. 1 inclusive of the rotational axis of the tire.

In these figures, reference numerals 1, 1' represent block type tread patterns of the present invention and the prior art as a typical example of the tread pattern, respectively. Reference numeral 2 is a pair of center blocks arranged in the circumferential direction of the tire to hold a center line of the tread therebetween. Alternatively, the center block may be formed as a zigzag type rib continuously extending in the circumferential direction of the tire. In the latter case, it is generally called as a rib-block type tread pattern by the combination with block arrangement as mentioned below.

Reference numeral 3 is a center groove curvedly extending toward the circumferential direction of the tire at the center of the tread width. Reference numeral 4 represents a pair of main grooves holding the center blocks 2 therein and partitioning them from a pair of tread side portions 5. Reference numeral 6 represents auxiliary oblique grooves dividing the center blocks 2 into block segments together with the center groove 3 and main grooves 4.

In each of the tread side portions 5 are formed two rows of inner block 9 and outer block 10 defined by a tread sub-groove 7 continuously extending toward the circumferential direction of the tire, the main groove 4 and transverse grooves 8 communicating with the main groove 4 across the sub-groove 7 to open it in a shoulder portion of the tire.

In the embodiment of FIG. 1, the transverse groove 8 extends toward the widthwise direction of the tread 1, 1' at an angle perpendicular to the circumferential direction of the tire. However, the direction of the transverse groove may be slightly obliqued with respect to the right angle.

The tread pattern of this type as described above has usually been used in heavy duty pneumatic tires suitable for heavy vehicles such as a bus, truck and the like because it has excellent traction performance, heat durability and wet-resistant performance. However, eccentric wear is often caused on the blocks 9, 10 in the tread side portion 5, so that there is still a drawback in the wear life.

Figure 3A:
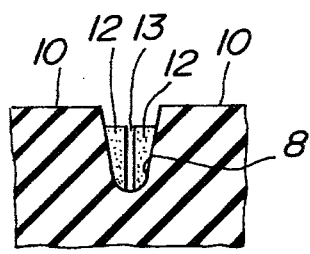
FIGS. 3a to 3d are partial sectional views taken along the lines A—A, B—B, C—C and D—D of FIG. 1, respectively.
Figure 3B:
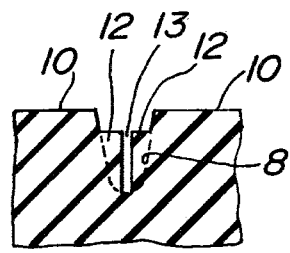
Figure 3C:
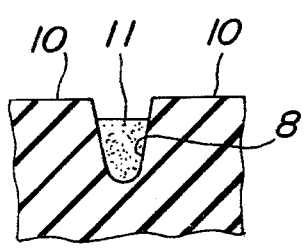
Figure 3D:
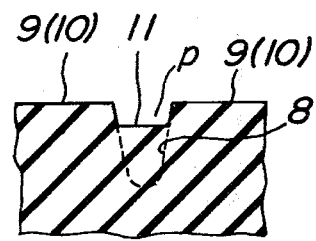

In order to solve this drawback, there has hitherto been attempted to prevent the movement of the blocks 9, 10 at the ground contact area during the rotating of the tire by providing so-called platforms 11 (see FIGS. 3c and 3d) in the transverse groove 8 as shown in right half of FIGS. 1 and 2 to connect the adjacent blocks 9, 9 and 10, 10 opposing through the transverse groove 8 with each other. In this case, it is not a serious problem for holding a drain path p (see FIG. 3d) of the transverse groove 8 through the upper surface of the platform 11 from the main groove 4 to the shoulder part of the tire in an initial usage period of tire. However, with the advance of the tread wear the upper surface of the platform becomes equal to the upper surface of the block and directly contacts with the ground, so that the wear life is improved, but the drain path of the transverse groove 8 is shut off and hence the deterioration of the wet-resistant performance becomes conspicuous. As a result, the tire of such prior art cannot be put to practical use.

The present invention provides another solution for avoiding the drawback of the above mentioned platform and is characterized by arranging buttresses 12 between the adjacent blocks 9, 9 and 10, 10 opposing to each other in the circumferential direction of the tire, each of which buttresses nestling from the bottom of the transverse groove 8 along the groove wall thereof and being partly united with the groove wall, as shown in the left half of FIGS. 1 and 2. Further, the buttress 12 extends toward the direction of the transverse groove 8 at a height lower than the surface level of the blocks 9, 10 and is arranged to produce a narrow gap 13 between the opposed adjacent buttresses 12 or between the buttress 12 and the opposite block.

The buttress 12 serves to effectively prevent the movement of the blocks 9, 10 at ground contact area under a load during the rotating of the tire when the extension length of the buttress is at least within a range of 40% to 80% of the depth of the transverse groove, whereby the eccentric wear of the blocks 9, 10 can effectively be prevented. At the same time, when the gap 13 between the opposed adjacent buttresses 12 or between the buttress 12 and the opposite block is 0.3 to 1.5 mm, drain water can advantageously be led from the main groove 4 through the transverse groove 8 and the gap 13 without seriously influencing on the wet-resistant performance of the tire.

Moreover, it is desirable that the lower end of the gap 13 becomes equal to the bottom of the transverse groove 8. When the lower end is not equal to the bottom of the transverse groove, it has been confirmed from experiments that the desired object can be achieved if the depth of the gap is at least 25% of the height of the buttress measured from the bottom of the transverse groove.

The gap 13 is fundamentally parallel to the direction of the transverse groove 8, but may be slightly oblique with respect to the direction of the transverse groove as far as the drain path is formed in the transverse groove.

A braking test on wetted asphalt road was carried out under the following test conditions with respect to a steel radial tire of a size 10.00-20 wherein a depth of a transverse groove is 16.5 mm, a gap is 0.5 mm and a depth of the gap is 12 mm. As a result, the braking distance was improved by 2% just after the use of the tire and by about 5% or more after the use corresponding to about a half of the wear life as compared with the tire of the prior art reinforced with the platform as mentioned above.

| Test Conditions: Braking Performance test on wetted surface according to | |
|---|---|
| JIS-D1013 | |
| Load | : 100% equally distribution according to JIS |
| Speed at the beginning of the braking operation | : 60 km/hr, 80 km/hr |
| Inner pressure | : 7.25 kg/cm² |
| Warming up | : running at about 1 km |

According to the invention, the durability of the heavy duty pneumatic tire can considerably be improved without deteriorating the wet-resistant performance, so that the invention is useful in the improvement of performances of this type tire such as traction performance, heat resistance and the like.

What is claimed is:

1. In the heavy duty pneumatic tire having a shoulder portion, a tread pattern having rows of projections arranged independently and spaced apart from each other in the circumferential direction of the tire, and transverse grooves for separating the projections one from the other, the improvement comprising; projections defining a row nearest said shoulder portion being separated from each other by transverse grooves communicating with and opened to said shoulder portion, said protections provided with a buttress nestling from the bottom of said transverse groove along the groove wall thereof and being partly united with the groove wall, and said buttress extending toward the direction of said transverse groove at a height lower than the surface level of said projection and arranged to produce a narrow gap between the opposed adjacent buttresses or between the buttress and the opposite projection, said narrow gap being closed when the force acting on the tire exceeds a predetermined value.

2. A heavy duty pneumatic tire as claimed in claim 1, wherein said gap is 0.3 to 1.5 mm.

3. A heavy duty pneumatic tire as claimed in claims 1 or 2 wherein the depth of said gap is at least 25% of the height of said buttress measured from the bottom if said transverse groove.

4. A heavy duty pneumatic tire as claimed in claims 1 or 2 wherein said gap has a lower end, said lower end having a depth equal to the bottom of said transverse groove.

5. A heavy duty pneumatic tire as claimed in claim 1 wherein the height of said buttress is in the range of 40% to 80% of the depth of said transverse groove.

6. A heavy duty pneumatic tire as claimed in claims 1 or 5 wherein the length of said buttress extending along the transverse groove is at least 30% of the length of the projection extending along the transverse groove.

* * * * *